Aug. 26, 1969

F. F. STUBBS 3,463,147

BODY JOINT SUPPORT

Filed June 28, 1966

INVENTOR.
FRANK F. STUBBS

BY R. E. Geaugue

ATTORNEY

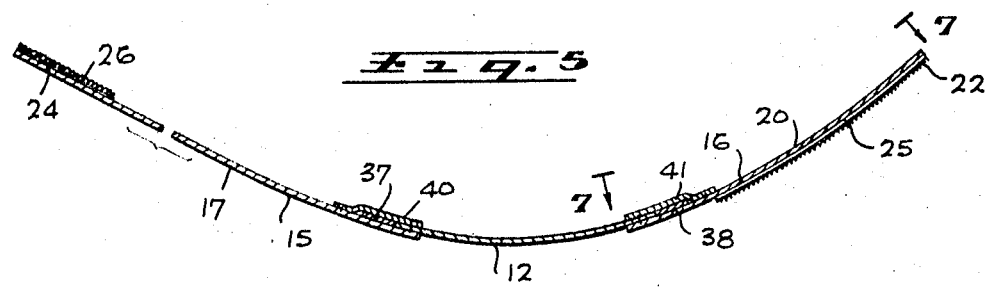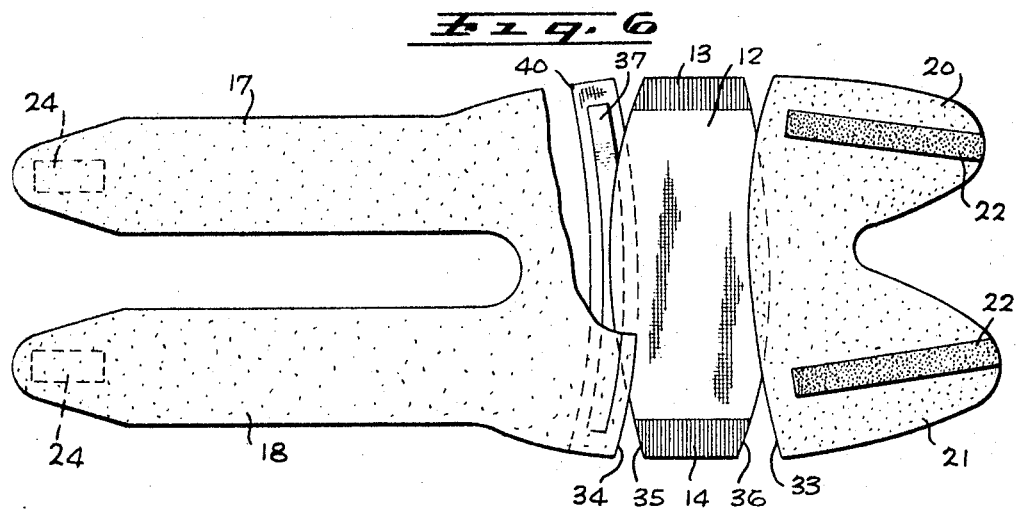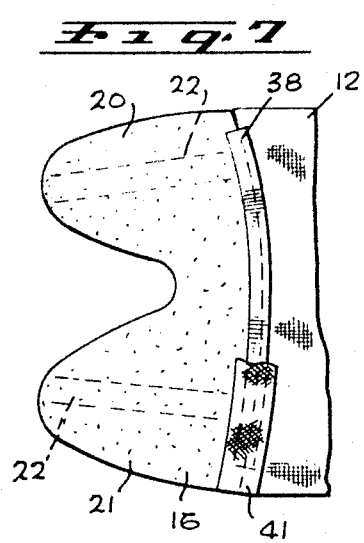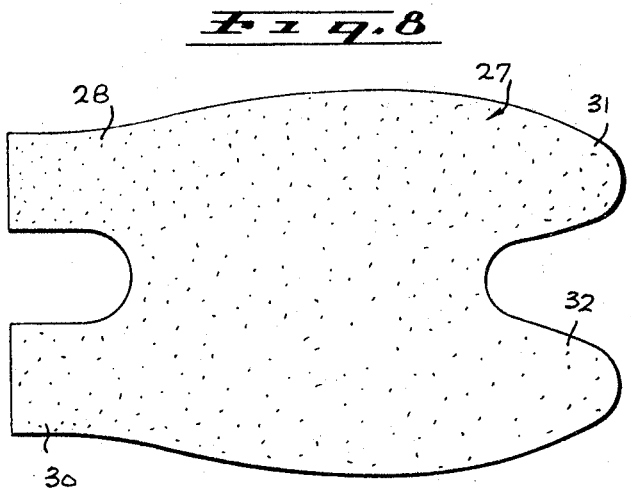
INVENTOR.
FRANK F. STUBBS
BY R.E. Geangue
ATTORNEY Aug. 26, 1969     F. F. STUBBS     3,463,147
BODY JOINT SUPPORT
Filed June 28, 1966     3 Sheets-Sheet 3
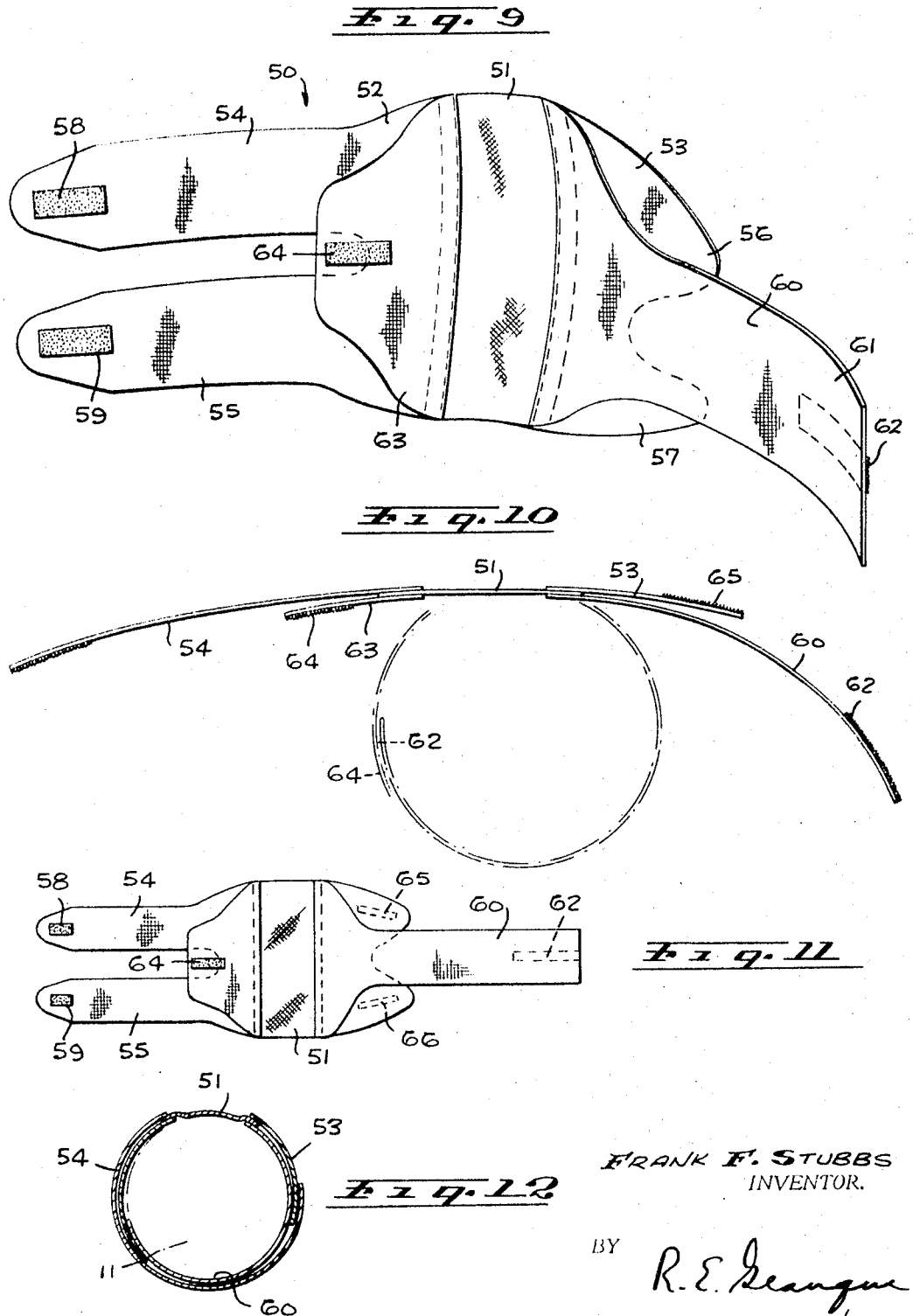

United States Patent Office 3,463,147
Patented Aug. 26, 1969

3,463,147
BODY JOINT SUPPORT
Frank F. Stubbs, 6718 Alcove Ave.,
North Hollywood, Calif. 91606
Filed June 28, 1966, Ser. No. 561,124
Int. Cl. A61f 5/37; A41c 1/00
U.S. Cl. 128—80                                       5 Claims

ABSTRACT OF THE DISCLOSURE

This invention relates to arm and leg joint supports and more particularly to a novel elbow or knee joint support which prevents an uncomfortable gathering of material under the joint as the body extremity is flexed and which evenly distributes tension about the joint intended to be supported.

---

Body joint braces or supporters, such as for the knee and elbow, have been employed in the past that apply to a constricting force about the joint to be supported. Generally, these conventional devices incorporate the elastic bands or special hinge sections which lie against the backside of the joint. In some instances, the lace segments of the supporting material are employed which are drawn taut about the joint. Examples of such prior art supporting devices are disclosed in U.S. Patent Nos. 2,251,362, 2,858,540 and 3,074,400.

Difficulties have been encountered when employing such conventional supporters or braces which stem largely from the fact that portions of the supporter material, whether it be elastic material or a tensioned band, tend to gather and bunch immediately behind the joint when the joint is flexed. Obviously, such a material gathering is uncomfortable and tends to restrict or hamper the freedom of body extremity movement. Furthermore, an even distribution of applied tension about the joint is not readily achieved when laces, buckles, straps or the like are employed for securing the supporter on the joint since the securement means requires mating of cooperative elements at predetermined points. These predetermined points may not always be the proper points for applying the necessary amount of tension or the even distribution of tension about the joint.

These difficulties as well as others are obviated by the brace or supported device of the present invention which provides a joint cap portion composed of elastic material adapted to snugly fit over the cap of the joint and which extends along the opposite side of the joint to terminate with strap means adapted to encircle the body extremity portions which are joined by the joint. The strap means incorporates upper and lower fastening bands that are arranged in spaced-apart relationship so as to expose the rear area of the joint whereby the gathering of material behind the joint is completely avoided as the joint is flexed. Each of the upper and lower fastening bands comprises a pair of opposing straps having overlapping terminating ends that carry a pressure sensitive securement means so that a properly tensioned fit of the supporter about the joint may be achieved. Immediate the area in which the opposite sides of the elastic material join with the strap means, there is provided a vertically disposed semirigid stay which is employed for preventing vertical gathering of the material on the opposite sides of the joint and for providing vertical support.

The joint support of the present invention will fit different sized joints while still covering the joint cap and the opposite sides of the joint in order to brace and reinforce the knee or elbow. By utilizing a hook and pile tape as the pressure sensitive fastening means, commonly known in the trade by the mark Velcro, it is possible to tightly fasten the supporter around the joint and to lock it in the most convenient position since it is not necessary to line up female and male members of snaps or other types of fastening devices or to select the nearest buckle opening in a strap. Also, the device of the present invention can be utilized either on the left or right leg or arm depending upon which joint is to be reinforced. The subject invention is particularly suitable for bracing the elbow or knee joint during the playing of various sports. However, it is also useful as a support for injured or sprained joints.

Therefore, it is a primary object of the present invention to provide a novel body extremity brace or support which prevents the uncomfortable gathering of material along the sides of the joint as well as immediately behind the joint as the body extremity is flexed.

Another object of the present invention is to provide a novel elbow or knee brace which is adapted to encircle the joint in such a fashion that an even amount of tension is distributed about the joint and which incorporates adjustable securement means for readily adjusting the application of tension to a desired amount.

Still a further object of the present invention is to provide a novel knee or elbow brace which employs portions of elastic material and portions of semirigid material that are strategically disposed about the joint so as to permit the flexing of the joint while at the same time providing an even distribution of tension about the joint.

Yet another object of the invention is to provide a novel body joint support which incorporates semirigid vertical stays on opposite sides of the joint for preventing the vertical gathering of supporter material and for evening by distributing the tension applied to the joint under the pull of the applied tension effected by the fastening means for securing the supporter on the joint.

In order that the invention may be more clearly understood, reference will now be made to the accompanying drawings, wherein an embodiment of the invention is shown for purposes of illustration, and wherein:

FIGURE 5 is a cross-sectional view of the knee support as taken in the direction of arrows 5—5 of FIGURE 3;

FIGURE 6 is a plan view of the exterior surface of the knee support illustrating a general arrangement of the component parts thereof prior to assembly;

FIGURE 7 is an enlarged fragmentary view, partially broken away of a portion of the support shown in FIGURE 5 in the direction of arrow 7—7 thereof;

FIGURE 8 is a plan view of the cushion pad employed in the knee support of the present invention;

FIGURE 9 is a perspective view of another embodiment of the present invention incorporating additional strap means for reinforcing a body joint;

FIGURE 10 is a plan view of the joint support shown in FIGURE 9;

FIGURE 11 is a side elevational view of the joint support shown in FIGURE 9 and illustrating the fastening means therefor; and FIGURE 12 is a cross-sectional view of the joint support as worn about the knee joint of a wearer.

Figure 1:
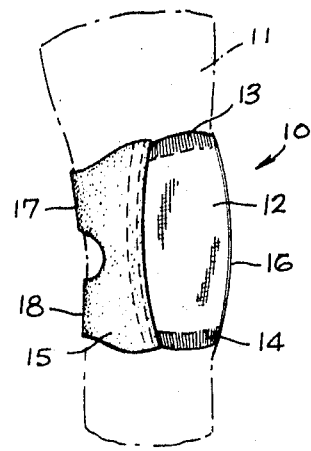
FIGURE 1 is a perspective view of the novel joint support incorporating the invention illustrated in typical use for bracing a knee joint.
Figure 2:
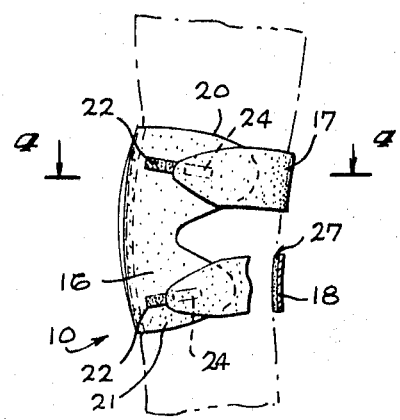
FIGURE 2 is a side elevational view of the support shown in FIGURE 1 illustrating the fastener means for securing the support about the knee.

Referring to FIGURES 1 and 2 of the drawings, a joint support in accordance with the present invention is illustrated in the general direction of arrow 10 and the support is shown as applied to the knee of a leg extremity 11. However, it is to be understood that the supporter of the present invention may be applied to applications for bracing and reinforcing an elbow joint as well. Therefore, although the specific embodiment of the present invention will be referred to as a knee supporter and will be described in connection with the knee joint, it is to be understood that the device will and can also be applied to other body joints such as an elbow joint.

The supporter 10 includes a knee cap covering panel or section 12 composed of elastic material which is disposed across the area of the knee cap and extending rearwardly along the opposite sides of the knee cap. The upper and lower ends 13 and 14, respectively, of the elastic material are intentionally gathered, such as by sewing, so that these ends pull together in a horizontal direction across the upper and lower leg areas about the knee cap. Along the opposite sides of the plastic panel or section 12 are a pair of relatively inelastic strap members having body portions 15 and 16 that extend along the sides of the knee. The body portions 15 and 16 are preferably composed of a soft fabric which may conveniently take the form of plasticized fibers so that the material will be somewhat rigidized as compared with the relative thin and elastic texture forming the composition of the cover 12.

Extending rearwardly from each of the body portions 15 and 16, respectively, there is provided a pair of upper and lower bands which are adapted to encircle the rear of the knee joint and which are arranged in spaced-apart relationship from each other so as to expose a substantial portion of the leg immediately behind the knee joint. In this manner, no material may gather or bunch behind the knee as the joint is flexed.

Each of the upper and lower bands comprise a pair of elongated straps 17 and 18 which are integrally formed on one end with the body portion 15 and which encircle the leg 11 to terminate with a pair of corresponding straps 20 and 21 integrally formed with the body portion 16. The upper and lower bands carry a fastening device which consists of a pile fastening member 22 on the upper surface of strap terminating ends 20 and 21 and of a hook fastening member 24 on the underside of the terminating end portion of straps 17 and 18 near the end thereof. The fastening device is generally referred to by the trademark Velcro. As illustrated, the pile member 22 consists of a group of relative fine fibers 25 and as illustrated in FIGURE 5, the hook member 24 consists of spaced, upstanding hook elements 26. When the fastening members are pressed together, as shown in FIGURES 1 and 2, the fibers are held by the hooks and considerable force is required to disconnect the members.

The knee supporter 10 further includes a pre-formed soft cushioned pad 27 which is intended to lie against the knee and portions of the leg interposed between the elastic material 12, body portions 15 and 16, and straps 17–21. Preferably, the cushion is composed of a relatively resilient and flexible foaming composition formed from such plastics as polyurethane or polyethylene. The cushion pad 27 is particularly configured and contoured to conform to the general layout of the supporter and is more clearly seen in the layout illustrated in FIGURE 3.

Figure 3:
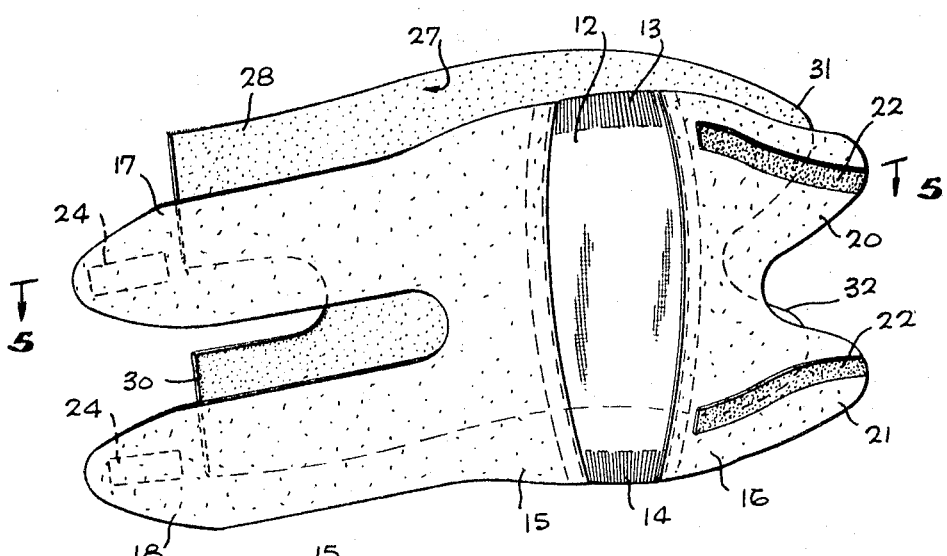
FIGURE 3 is a plan view of the exterior surface of the support shown in its laid-out condition preparatory to being disposed about the knee joint.

Referring now to FIGURE 3, the general layout of the supporter 10 is illustrated which more clearly illustrates the configuration of the pad 27 wherein the pad includes extensions 28 and 30 which are intended to lie beneath elongated straps 17 and 18 and further includes extensisons 31 and 32 which extend from the opposite end of the pad so as to lie against the skin beneath shorter straps 20 and 21. Also, it is more clearly illustrated that the pile member 22 of the fastener is of substantially greater length than the length of the corresponding hook member 24 carried on the underside of terminating straps 17 and 18. Because of the necessity of the elastic material 12 to be able to cover the projecting knee cap, it is indicated in FIGURE 3 that when the device is not applied to the knee, the opposite ends of the material are drawn so that an excess of material is disposed in the center area thereof. To achieve this construction, it is desirable to shape the edge of the body portion 15 and 16 which bound the elastic material 12 to provide a slight curvature. FIGURE 6 more clearly illustrates the typical curvature of edges 33 and 34 opposing each other prior to attachment to the opposite sides of elastic material 12. Additionally, it is to be noted that the opposite side edges 35 and 36 of the elastic material 12 are provided with a slight curvature opposite to the curvature provided in edges 33 and 34, respectively. Once the opposing oppositely curved edges 33 and 36 and 34 and 35 have been joined together, such as by stitching or sewing, the required excess of material in the center area of material 12 is assured.

Figure 4:
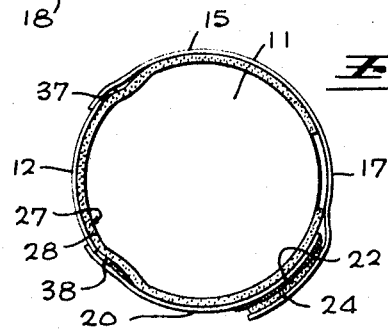
FIGURE 4 is a cross-sectional view of the knee support as worn and as taken in the direction of arrows 4—4 of FIGURE 2.

Referring now to FIGURES 4 and 5, the supporter device of the present invention is further provided with a pair of semirigid flexible stays 37 and 38 which are vertically disposed on opposite sides of the knee cap and are spaced apart by the material 12. The stays are employed to lie substantially in a vertical direction on opposite sides of the knee cap so that an even amount of tension is distributed across the knee cap and on the sides thereof when the bands are fastened together. Furthermore, the provision of semirigid material in this location prevents the vertical gathering of body portion material as the joint is flexed. The stays may take the form of any conventional material, such as for example, bone, metal, or the like. Preferably the stays 37 and 38 are removably secured in a pocket formed by a material strip 40 and 41 that serves to cover the stay and maintain the stay in confinement against and in cooperation with the body portions 15 and 16, respectively. In addition to the ability of the stays to flex, it is preferred that the length of the stays be curved so as to correspond to the curving edge of the body portion adjacent the stay. The pockets confining these stays may be either open at its ends or closed by such means as stitching or sewing. If open, the stays may be selectively removed, if desired, in the event that the user of the supporter cannot wear the stays with comfort or if the employment of the stays are deemed unnecessary.

Referring now to FIGURE 6, a general layout of the components of the supporter of the present invention is illustrated preparatory to assembly into the final unit. This view more clearly illustrates the curvature of opposing edges 34 and 35 and opposing edges 33 and 36. Also, the view more clearly illustrates stay 37 of the pair of stays and the strip 40 employed to define a pocket into which the stay 37 is disclosed and confined. The strip 41 and stay 38 employed on the opposite side of material 12 is not illustrated for purposes of convenience and clarity.

Referring now to FIGURE 7, it can be seen that strip 41 is attached on its opposite longitudinal sides to the edge portion 33 and the material edge portion 36 so as to confine the stays 41 along the seam joining the body section or portion 16 to the material 12.

FIGURE 8 shows that the general contour of cushion pad 27 conforms to the general overall outline of the tension applying strap and material shown in FIGURE 6.

In view of the foregoing, it can be seen that the supporter 10 of the present invention can be securely placed about the knee joint on a leg 11 in such a fashion that the material 12 covers the area of the knee cap. The material 12 being of elastic texture will tension the area of the knee cap. Gathered opposite ends 13 and 14 of the material 12 further applies slight tension to the areas above and below the knee cap to assure proper distribution of tension thereto. The encircling straps 17 and 18 further adjusts tension of the device about the knee joint so that an even distribution of tension is applied. The securement of the hook and pile fastening means not only assures the application of constant tension to the joint but maintains the pad 27 in position between the skin of the leg and the inside surface of the tensioned strap and band portions. The semirigid and flexible stays 37 and 38 prevent vertical gathering and lend additional support on opposite sides of the knee cap.

Referring now to FIGURE 9, another embodiment of the present invention is illustrated in the direction of arrow 50. The supporter 50 includes a knee cap covering panel or section 51 composed of elastic material and which is gathered at the top and bottom in a similar manner as shown in the embodiment of FIGURE 1. Along opposite sides of the elastic panel are a pair of relatively inelastic strap members having body portions 52 and 53 that are adapted to extend along the sides of the knee joint. In the same manner as previously described with respect to the supporter 10, the body portions 52 and 53 are preferably composed of a cloth fabric and are provided with a pair of upper and lower band means which may be said to comprise a pair of elongated straps 54 and 55 that are integrally formed on one end of the body portion 52 and which encircle the user's leg to terminate with a pair of corresponding straps 56 and 57 integrally formed with the body portion 53. The straps 54 and 55 are secured to the straps 56 and 57 respectively by means of the Velcro fasteners 58 and 59 as previously described with respect to the supporter embodiment 10.

Supporter 50 deviates from the construction of the supporter 10 by including a joint reinforcing means comprising a second pair of relatively inelastic strap members. One strap member has an elongated strap 60 extending from a body portion that is secured along one edge to the adjacent edge of the elastic material 51 and terminates at its opposite end in a reduced width end 61 that carries a hook fastening member 62 on its exterior surface. The terminating end 61 of the strap 60 is intended to mate with and fasten to the body or side portion 63 of the other strap member by means of the pile fastening member 64 located on the inner surface of the side section 63. The side section 63 is secured along the edge marginal region of the elastic material 51 opposite to its edge marginal region attached to the strap 60.

As illustrated more clearly in FIGURES 10 and 11, the fastening means for the strap 60 and side section 63 includes a hook end pile fastening member 65 and 66 so that when properly secured, the strap 63 completely encircles the knee joint and is partially interposed between the inside surface of the straps 54 and 55 and the knee. It is also to be noted that strap 60 extends outwardly from the side of the elastic material 51 opposite to the side from which the pair of supporting straps 54 and 55 extend.

Referring now to FIGURE 12, it can be seen that when the joint supporter 50 is applied to the leg of a user that the knee joint is completely encircled by the supporter and that, except for the area of the knee cap covered by the material 51, the knee joint is substantially supported and reinforced by a double thickness of supporting straps and bands. If desired, the supporter 50 may also include the flexible metal reinforcing strips 38 and, for simplicity of construction, seams or threaded connection for assembling the device may join the body portion 52 and the side section 63 together at the edge marginal region of the elastic material 51 while the same stitching or threaded connection may also be employed for retaining the body portion 53 and the end of the strap 60 to the opposite edge marginal region of the elastic material 51.

The supporter of the present invention maintains a snug fit while providing a sufficient support for the knee joint, bones and ligaments at all points with the result that the knee support offers a complete range of motion for normal activity and restricts only those abnormal or excessive motions most likely to cause injury or tissue damage in a healthy knee or to aggravate the condition of an already injured knee.

While there have been shown and described and pointed out the fundamental novel features of the invention as applied to a preferred embodiment, it will be understood that various omissions and substitutions and changes in the form and detail of the device illustrated and in its operation may be made by those skilled in the art without departing from the spirit of the invention; therefore, it is intended that the invention be limited only by the scope of the following claims.

What is claimed is:
1. A body limb joint supporter comprising:
a one-piece elastic panel which is stretchable in all edgewise directions and has a generally rectangular shape in its normal unstretched condition,
said panel having convex longitudinal side edges which arch outwardly away from one another to provide said panel with a relatively wide mid-section and relatively narrow ends,
a pair of relatively inelastic strap members along the longitudinal edges, respectively, of said panel,
each strap member including a body portion having an inner concave edge coextensive with and joined along its full length to the adjacent convex longitudinal edge of said panel,
one strap member also including a pair of straps extending from the outer edge of its respective body portion generally normal to the length of said panel and in spaced parallel relation to one another,
coacting fastener means on the free ends of said straps and on the body portion of the other strap member for releasably securing said strap ends to the latter body portion,
said supporter being adapted to be applied about a body limb in constrictive encircling relation to a joint in said limb in a manner such that said elastic panel overlies and is stretched taut across the cap of said joint, said strap body portions straddle and press inwardly against opposite sides of said joint, and said straps extend about the inner side of said joint above and below the region directly behind said joint so as to expose said region, whereby said supporter applies a generally uniform elastic constricting pressure to said joint without inhibiting flexing of said joint.
2. A supporter according to claim 1 including:
a pair of relatively stiff though flexible stays secured to said supporter approximately along the joined edges of said panel and strap body portions.
3. A supporter according to claim 1 wherein:
the ends of said panel are gathered laterally to condition said panel to apply constricting pressure to said limb above and below said joint.
4. A supporter according to claim 1 including:
a pair of second strap members along said convex longitudinal edges of said panel disposed in overlapping face to face relation with said first mentioned strap members, respectively,
each second strap member including a body portion having an inner concave edge coextensive with and joined along its full length to the adjacent convex longitudinal edge of said panel,
one second strap member also including a single strap extending from the outer edge of its respective body portion in generally parallel relation to and in longitudinal alignment with the space between said pair of straps, and
coacting fastener means on the free end of said single strap and on the body portion of the other second strap member for releasably securing said single strap end to the latter body portion.

5. A supporter according to claim 4 wherein:
said pair of straps extend from one side of said panel and said single strap extends from the opposite side of said panel.

References Cited

UNITED STATES PATENTS

| | | | |
|---|---|---|---|
| 1,601,659 | 9/1926 | Van Harlingen | 128—165 |
| 2,311,483 | 2/1943 | Smith | 128—165 |
| 2,858,540 | 11/1958 | Morrison | 2—24 |
| 3,216,417 | 11/1965 | Posey | 128—149 |

FOREIGN PATENTS 11,784    2/1928    Australia.

RICHARD A. GAUDET, Primary Examiner

J. D. YASKO, Assistant Examiner

U.S. Cl. X.R.

2—24; 128—165